US006961940B2

(12) United States Patent
Hunsinger et al.

(10) Patent No.: US 6,961,940 B2
(45) Date of Patent: Nov. 1, 2005

(54) DYNAMICALLY ADAPTING EVENTS TO CAPABILITIES OF A MANAGEMENT SYSTEM

(75) Inventors: Kenneth Mark Hunsinger, Raleigh, NC (US); Patrick P. Reynolds, Morrisville, NC (US); Abdolreza Salahshour, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 09/849,145

(22) Filed: May 4, 2001

(65) Prior Publication Data

US 2002/0165997 A1    Nov. 7, 2002

(51) Int. Cl.⁷ ............................ G06F 3/00; G06F 9/44; G06F 9/46; G06F 13/00
(52) U.S. Cl. ...................................... 719/318; 709/223
(58) Field of Search ..................... 719/310, 311–320, 719/328–330; 709/223–226

(56) References Cited

U.S. PATENT DOCUMENTS

| | | | |
|---|---|---|---|
| 5,063,523 A | 11/1991 | Vrenjak | |
| 5,291,602 A | 3/1994 | Barker, et al. | 395/700 |
| 5,355,484 A | 10/1994 | Record, et al. | 395/650 |
| 5,488,648 A | 1/1996 | Womble | 375/13 |
| 5,499,364 A | 3/1996 | Klein, et al. | 395/200.03 |
| 5,625,821 A | 4/1997 | Record, et al. | 395/670 |
| 5,832,224 A | 11/1998 | Fehskens et al. | 395/200.53 |
| 5,872,966 A | 2/1999 | Burg | 395/651 |
| 6,061,709 A | 5/2000 | Bronte | |
| 6,125,442 A | 9/2000 | Mayers et al. | 712/220 |
| 6,446,136 B1 * | 9/2002 | Pohlmann et al. | 719/318 |
| 6,681,245 B1 | 1/2004 | Sasagawa | |
| 6,697,814 B1 * | 2/2004 | Porter | 707/102 |
| 2002/0083168 A1 * | 6/2002 | Sweeney et al. | 709/224 |

\* cited by examiner

Primary Examiner—Thomas Lee
Assistant Examiner—Diem Cao
(74) Attorney, Agent, or Firm—Marcia L. Doubet

(57) ABSTRACT

Methods, systems, computer program products, and methods of doing business by automatically and dynamically annotating events in an event management system ("EMS") to adapt to capabilities of a management system of which the EMS is an integral part. Furthermore, the EMS may automatically and dynamically recycle existing events (including events which are already annotated) for processing with newly-defined or different EMS capabilities. Events may also be re-annotated to reflect new or different capabilities of the EMS. These benefits of "smart events" are realized without requiring re-instrumentation of the event generation code of managed applications.

30 Claims, 7 Drawing Sheets

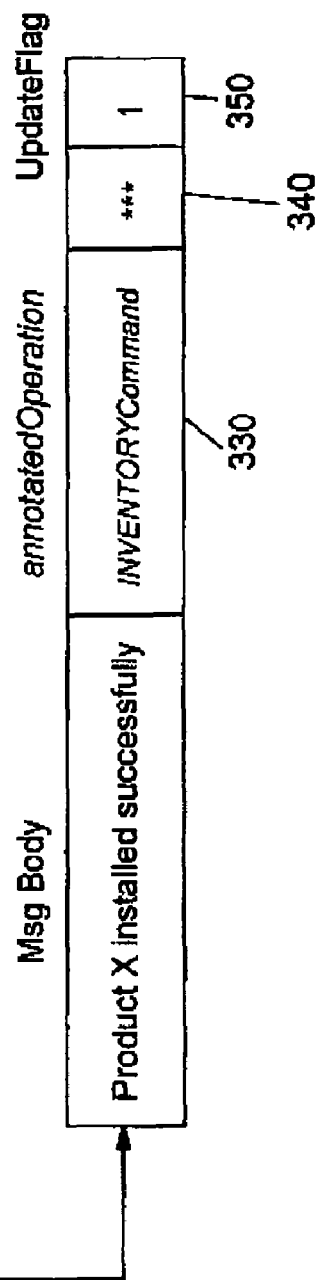

401  402
InstallProdClass,msgId=PRD1234I,severity=I,hostId=RTP32,vendorId=Vendor X,compName=Product X v1.5,msgText=Product X installed successfully,updateFlag=1,*annotatedOperation=INVENTORYCommand* ← 410

FIG. 4B

420
```
class InstallProdClass : SuperEvent          ← 422
{
    string msgId;      ← 430
    string severity;   ← 440
    string hostId;
    string vendorId;
    string compName;
    string msgText;
    Boolean updateFlag;
    string annotatedOperation;
};
```

FIG. 5

```
if (MsgID = 'PRD1234I' AND annotatedOperation != '"' AND !updateFlag )
{
  action ( INVENTORYCommand )
};
```

500
501
502
503
504

DYNAMICALLY ADAPTING EVENTS TO CAPABILITIES OF A MANAGEMENT SYSTEM

Related Invention

The present invention is related to commonly-assigned U.S. Pat. Ser. No. 09/849,848, filed concurrently herewith), which is entitled "Recycling Events to Take Advantage of Capabilities of a Management System".

BACKGROUND OF THE INVENTION

1. Field of the Invention

The present invention relates to a computer system, and deals more particularly with methods, systems, computer program products, and methods of doing business by enabling events to automatically and dynamically adapt to capabilities of a management system which is responsible for managing information technology resources in a complex and heterogeneous environment.

2. Description of the Related Art

An event generally comprises a message or notification of a significant status change that has happened in the application program or component generating the event. For example, an event may be generated when a software product is installed, or when an error message occurs during program execution, etc. In general, an event may be generated for any situation for which the application writer wishes to provide event generation code. Providing code to generate event messages or notifications and communicate them to a management system is often called "instrumenting" an application.

Software may be written to transform events in predetermined ways prior to delivering the events to an event management system (hereinafter, "EMS") which is an integral part of a management system. For example, such software may transform incoming messages into a common event syntax for use by the EMS. Prior art event management systems typically receive events which have been generated by executing application programs, analyze the received events and store them in a repository, and process the events in various ways (such as presenting visible warning messages to system operators, triggering automated execution of code to perform various tasks, and so forth). Some event management systems use a rule-based approach for the analysis and correlation of incoming events, to determine if an automated response has been defined via existing rules, and to fire a defined action in the rules base if so. An example of this type of prior art EMS is the Tivoli Enterprise Console® ("TEC") product from Tivoli Systems. ("Tivoli Enterprise Console" is a registered trademark of Tivoli Systems Inc.)

Several problems arise with prior art event management systems. First, the event syntax in prior art systems is static and non-extensible. That is, the messages which notify the EMS of the occurrence of an event contain a fixed number of name/value pairs (which are referred to as "slots" in the TEC event architecture) or, equivalently, a fixed number of object properties with corresponding object values in an object-oriented solution. The number of slots or properties in a particular event message, and the information contained therein, depends on the amount of significant data the application writer provided in the event-generation code which he or she wrote in the underlying application. (To a limited extent, additional slots or properties may be added as an event is being transformed for use by the EMS. The TEC system allows a managed organization to define software "event adapters", which transform incoming events in implementation-specific ways prior to forwarding the events to the EMS. However, such adapter code is written as an interface between the sending application and the EMS, and typically only provides simple reformatting transformations to account for existing capabilities of the EMS.) Often, providing additional data elements from an application on its events requires changing the application instrumentation, which is a time-consuming and costly process. The instrumentation in many application programs is written with either no knowledge of what management features an eventual EMS may provide in the future, or at best a point-in-time understanding of such features. Thus, the information provided by generated events often does not take full advantage of the capabilities which may be available in the EMS when the event is received.

Another problem with prior art event management systems is that the rules in the rule base are predefined and therefore static. New rules can typically be added to the rule base at any time, but just as re-instrumenting the application programs is time-consuming and expensive, adding new rules is also a labor-intensive and often error-prone task, as the person defining the new rules must take care not to disrupt the functioning of any existing rules and must ensure that the revised rule base functions properly. The practical result is that the rule base tends to stay fixed for long periods of time, and thus the rule base is often limited in its ability to provide the best actions that could be provided based upon the latest capabilities of the EMS.

Accordingly, what is needed is a technique that avoids the limitations of prior art event management systems.

SUMMARY OF THE INVENTION

An object of the present invention is to provide a technique that avoids the limitations of prior art event management systems.

Another object of the present invention is to provide a technique which enables events to automatically and dynamically adapt to, or "learn", capabilities of an EMS.

Yet another object of the present invention is to provide a technique for programmatically adding new information to events.

Still another object of the present invention is to provide a technique wherein an EMS can programmatically append newly-defined or different capabilities to previously-generated events.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for enabling events to automatically and dynamically adapt to capabilities of a management system, comprising: receiving one or more events; and evaluating each received event to determine if an additional capability is available, and programmatically appending the additional capability to the event if so, thereby automatically and dynamically adapting the received events to the capabilities of the management system without requiring change to applications generating the events. This technique further comprises programmatically invoking processing of the appended additional capabilities. Selected ones of the appended additional capabilities may comprise a name of an executable task, in which case the programmatic invocation may comprise executing the task. Or, selected ones of the appended additional capabilities may comprise a rule to be added to a rule base server, in which case the programmatic invocation may comprise evaluating the rule by the rule base server. Or, selected ones of the appended additional capabilities may comprise a property name and value, in which case the programmatic invocation may comprise determining if a rule associated with that property name and value exists in a rule base and evaluating the rule if so.

A flag may be used to indicate whether the appended additional capability for a selected event has been processed. A precondition for the programmatic invocation may comprise determining whether an appended additional capability is present on a selected event, and determining that the appended additional capability has not already been performed.

The programmatic appending may further comprise adding a slot to a representation of the event; adding a property to an object representing the event; or adding a field to a representation of the event.

The present invention may also be used advantageously in methods of doing business, for example by providing improved event management systems wherein the events dynamically learn new capabilities and/or the EMS programmatically appends newly-defined or different capabilities to previously-generated events.

The present invention will now be described with reference to the following drawings, in which like reference numbers denote the same element throughout.

BRIEF DESCRIPTION OF THE DRAWINGS

FIGS. 3A and 3B illustrate a sample event message of the prior art and a corresponding programmatically annotated event message which may be generated according to the present invention, respectively;

FIGS. 4A and 4B illustrate a sample event object which may be programmatically created according to the present invention to represent the annotated sample event message of FIG. 3B;

FIG. 5 illustrates a sample rule that may be used, according to the present invention, to trigger execution of newly-defined or different capabilities of an EMS using previously-defined events.

DESCRIPTION OF THE PREFERRED EMBODIMENTS

Figure 1:
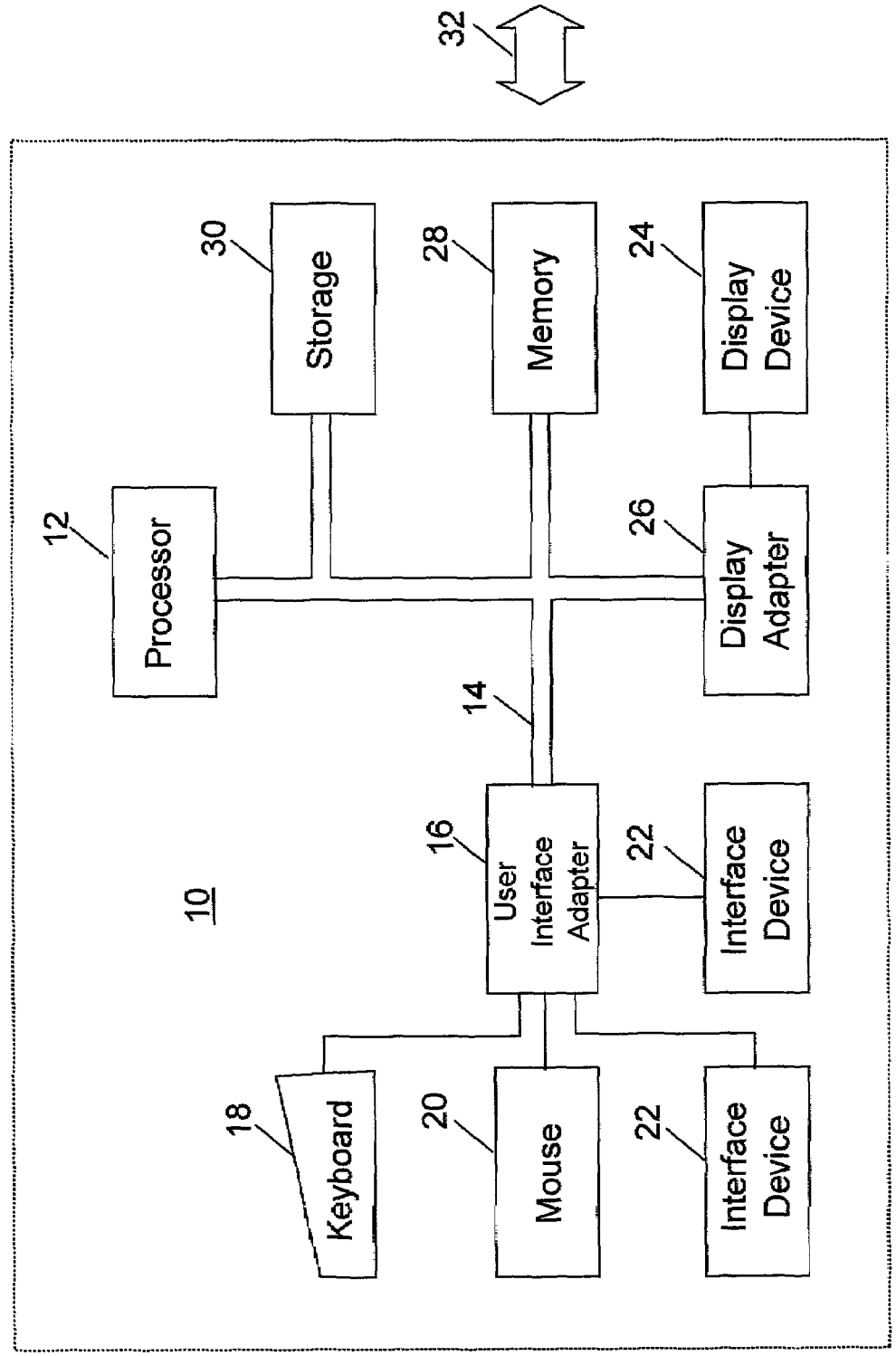
FIG. 1 is a block diagram of a computer hardware environment in which the present invention may be practiced.

FIG. 1 illustrates a representative computer hardware environment in which events may be generated by executing applications. The environment of FIG. 1 comprises a representative computer workstation 10, such as a desktop computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a WAN, or the workstation 10 can be a client in a client/server arrangement with another computer, etc. All of these configurations, as well as the appropriate communications hardware and software, are known in the art. Many other types of processor devices may also generate events to be managed by an EMS, including: laptop, handheld or mobile computers; vehicle-mounted devices; desktop computers; servers; and mainframe computers. These types of processor devices are well known to those of skill in the art, and a description of such devices herein is not deemed necessary for a thorough understanding of the inventive concepts of the present invention.

Figure 2:
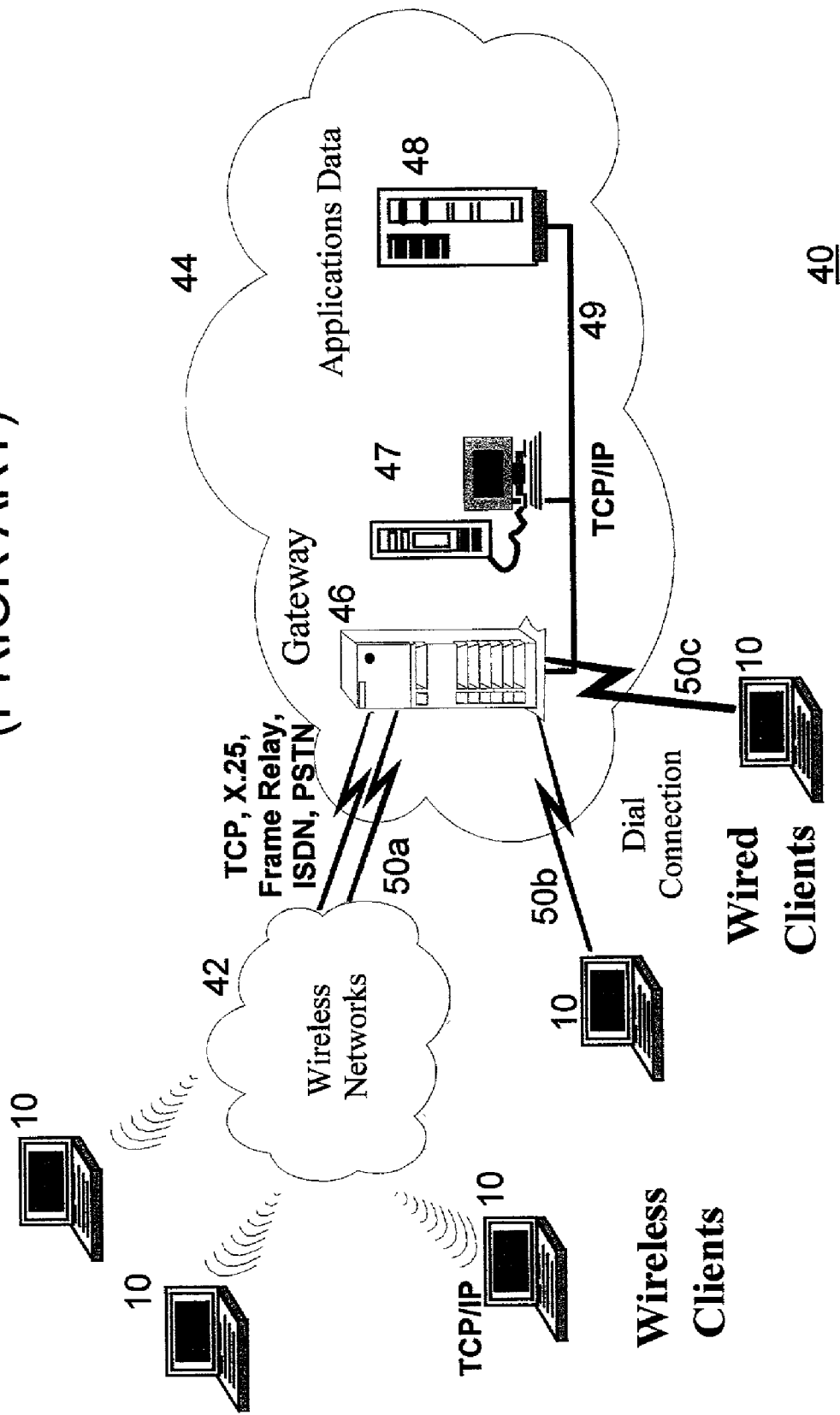
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly or indirectly coupled to one or more workstations 10 using a communications link 50b, 50c. The gateway computer 46 may also be coupled 49 to a storage device (such as data repository 48). The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Preferably, the present invention is implemented in software, although a combination of software and hardware may be used alternatively. For purposes of discussion, it will be assumed that the invention is implemented in software. Software programming code which embodies the present invention is typically accessed by a processor of server 47 or gateway 46 from long-term storage media of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory, and accessed by a processor using a system bus. The techniques and methods for embodying software programming code in memory, on physical media, and/or distributing software code via networks are well known and will not be further discussed herein.

Computers which generate events may be connected using a wireline connection or a wireless connection to a server or mainframe which operates an EMS. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The computer may be any type of processor, such as those described above, having processing and communication capabilities. The remote server or mainframe, similarly, can be one of any number of different types of computer which have processing and communication capabilities. These techniques are well known in the art, and the hardware devices and software which enable their use are readily available.

The computing environment in which the present invention may be used includes an Internet environment, an intranet environment, an extranet environment, or any other type of networking environment. These environments may be structured using a client-server architecture, a multi-tiered architecture, or an alternative network architecture. Furthermore, the present invention may be used within a computing device which does not form part of a network. For example, a mainframe computer may generate events and manage those events using its own local EMS.

In preferred embodiments, the invention will be implemented using object-oriented programming languages and techniques. However, the invention may alternatively be implemented using conventional programming languages that are not object-oriented, without deviating from the inventive concepts. Use of the term "object" herein is not to be construed as limiting the invention to object-oriented techniques.

The techniques of the present invention enable recycling and management of events which arrive at an EMS without having prior knowledge of the capabilities which may be available or become available as the EMS is enhanced and grows in functionality. New tasks or similar information may be programmatically assigned to incoming events for use by the EMS (for example, as it evaluates the events against its rule base). This programmatic assignment (also referred to herein as "annotating" the events) may also be performed on events which have already been received and stored in an event repository. Preferably, the annotation is based upon values (such as an event class) which may be present in the incoming or stored events. The annotation may (for example) trigger execution of an associated task at the time of assignment, or subsequently as the annotated events are evaluated or re-evaluated by the EMS. In addition to triggering execution of tasks, annotations may be used for other purposes, such as providing new rules for use in a rule base of the EMS. In preferred embodiments, an annotated event may be recycled (i.e. re-evaluated) any number of times by an EMS. Each different evaluation may perhaps trigger execution of different tasks, based upon changes which may have been made to the rule base. Furthermore, the evaluations may be used to re-annotate the events with additional or different information. The events may therefore be considered "smart events" which learn from their environment. These and other advantageous features of the present invention will be described in more detail herein, making reference to an exemplary embodiment in which the annotations pertain to registration (and, optionally, unregistration) of the software products installed on the processing device which generated the events.

Preferred embodiments of the present invention will now be discussed in more detail with reference to FIGS. 3 through 7.

FIG. 3A illustrates a message 300 of the prior art, having a fixed message architecture. (As used herein, the term "message" may be considered synonymous with an event. A message is generated to notify an EMS of the occurrence of an event; this notification is then considered an "event" to be processed by the EMS. An EMS may use a message generated by an application as an event without change to the message, or it may use the information provided in a message to generate an event in another form, perhaps by transforming the message elements into slots or object properties that are appropriate for a particular EMS.)

In the example of FIG. 3A, the format of message 300 comprises a message identifier; a severity indicator (which may, for purposes of illustration, be one of "E" for an error, "W" for a warning, "I" for information, or a numeric representation of any of these); a host identifier to identify the computer from which the message was sent; a vendor identifier and a component identifier, which may be used together to identify the application and/or component thereof which generated the message; a message body which provides descriptive text about the event; and an update flag 310. (As will be appreciated by one of skill in the art, this message format is merely illustrative.) This example indicates that an informational message is being sent (using a severity property wherein an "I" value for this property may signify that the message represents "information" rather than an error condition), and the information being conveyed is that a component identified as "Product X v1.5" from Vendor X and executing on host RTP32 has been installed successfully. Note that the update flag 310 is shown as being set to FALSE. This flag is used by the present invention, as will be described in more detail herein. For those applications which do not generate this flag as part of their outbound messages, the flag is preferably appended by a process such as an event adapter of the type previously described with reference to the TEC system or by programmatic evaluation of messages by software which embodies the present invention.

In prior art event management systems, one or more rules adapted for processing this message might exist in a rule base server. Typically, such rules are defined to search for particular message identifiers and/or particular values of one or more of the other fields of an event. If the EMS locates one or more rules which are applicable when processing message 300, those rules will fire. The rules may execute a wide variety of actions, as previously stated, such as displaying informational message 300 on a message console, or alternatively filtering the message from such a display because it does not represent an error condition which needs operator attention, and so forth. However, no actions other than those actions specified by existing rules which are in effect at the time of receiving the event will typically execute in prior art systems.

However, commonly-assigned U.S. Pat. No. 5,355,484, which is entitled "Dynamically Established Event Monitors in Event Management Services of a Computer System", teaches a technique whereby events can be retained in a repository if they arrive at an EMS but no event monitor has been registered as being "interested" in those events. The events may subsequently be processed when an interested event monitor is defined to the EMS (provided that any pre-conditions of the event monitor are met). Differences between this patent and the novel teachings of the present invention will be described in more detail below.

FIG. 3B illustrates an event annotation of the type disclosed by the present invention. The annotated message 320 has been programmatically created from message 300 by adding additional slots thereto. In this example, the additional slots are shown as elements 330 and 340. In addition, the value of slot 350 is modified. Added slot 330 specifies an executable task that pertains to the event represented by original message 300; added slot 340 indicates that additional tasks or other types of information may also be added, if desired. Slot 330 identifies an inventory registration process that may be invoked, and which (presumably) uses the content of its containing annotated message 320 for input. Update flag 350 is provided as a generic means for enabling an EMS to efficiently check its event repository to determine whether events exist which require attention or which can be recycled. This update flag may be provided as part of the transformation process which creates events from messages, as has been discussed, in which case the application generating the message does not need to be aware of the update flag. Note that events may be recycled as many times as desired, even though the update flag may be set to TRUE after a particular processing of that event. (Note that while the examples provide the name of an executable task as the annotation, this is for purposes of illustration and not of limitation. Other types of information may be provided, such as a rule or a simple property that might be associated with an existing rule.)

In the exemplary inventory registration embodiment, as each event pertaining to a successful product installation is received, that event is annotated to be aware of (i.e. to execute) an inventory registration task wherein an inventory repository can be updated to reflect the newly-installed product. Such an embodiment may be useful in a number of ways. As one example, many large organizations may have no manageable way of determining which of their employees have what software installed on their desktop computers. This situation may make it quite difficult to adhere to the licensing requirements of a myriad of software vendors whose products may be found scattered throughout the computers of the organization—with the net result being that the organization may be in violation of its licensing contracts. By detecting incoming "successful installation" messages of the type depicted in FIG. 3A, and annotating those messages as shown in FIG. 3B to invoke a registration operation with the inventory system, the organization can begin to keep track of what new software products are being deployed—even though the application from which the incoming message was generated is not aware of the EMS inventory system and nothing in the incoming message 300 specifically indicates that it should be used for this purpose.

As will be apparent, adding an inventory registration process to an existing computing installation and updating the inventory repository requires running an inventory agent on those machines that are intended to be inventoried, which can be a costly process. Also, often software and hardware are installed and un-installed outside of the scheduled inventory runs. By contrast, the event recycling process which is facilitated by annotated events, as disclosed herein, automates the registration process using previously received installation status events which are stored in an event repository and annotated such that they will cause registration of their corresponding software product into the inventory repository. This process may be summarized as follows. The existing messages in the event repository may be inspected, searching for those whose message identifier indicates that the message represents a successful software installation. By determining whether each such message contains the inventory registration annotation property or properties (as exemplified by element 330 of FIG. 3B), the event can be recycled to be reexamined by the EMS to take appropriate action(s). If the message does not contain the inventory registration information, then the annotation may be added, and the registration process may then be invoked. (Note that tasks which are specified in annotations may be invoked immediately, if desired, or the invocation may be delayed as in a batch-mode approach. This is discussed further below, with reference to FIG. 7.)

Continuing with the registration example, at some point in the future, it may be desirable to unregister products from the inventory system. Suppose, for example, that a new version 1.6 of Product X is installed, where this new version supercedes the version 1.5 represented by installation messages 300 and 320. If the application itself generates "successful un-installation" messages, then these messages can be detected and annotated for unregistration; alternatively, annotation logic may be written which is adapted to knowing that installation of Product X, version 1.6 necessarily implies un-installation of Product X, version 1.5. In this latter case, the "successful installation" messages can be detected and can be used (i.e. recycled) to perform both the registration of Product X, version 1.6 for a particular sending device as well as the unregistration of Product X, version 1.5 for the same device. This might be accomplished in several different ways, such as by adding the registration task for version 1.6 as shown in slot 330 of FIG. 3B and inserting an unregistration task for version 1.5 into slot 340, or perhaps by inserting a rule into slot 340 of the incoming version 1.6 message which causes any already-existing (but physically separate) version 1.5 "successful installation" event message for this sending device to be automatically annotated with an unregistration task.

This type of recycled event processing is not contemplated by U.S. Pat. No. 5,355,484, "Dynamically Established Event Monitors in Event Management Services of a Computer System", which was described above. As disclosed therein, there is no addition of information to the events which are held as "loose signals" awaiting an interested event monitor. Instead, what is passed to the eventually-defined interested event monitor therein is the event as it was originally received from an executing application.

In addition to annotating events and recycling them for use in inventory registration, many other applications of the techniques disclosed herein will be apparent once the inventive concepts of the present invention are known. For example, a backup/restore or archival system may make beneficial use of these techniques, whereby each installed software product can programmatically make itself known to the backup/restore or archival system without requiring any alteration of the software product itself to add information to the product's generated event messages. Instead, applicable events may be located as they arrive at an EMS and/or by searching through existing events in an event repository of the EMS, and may then be annotated to cause invocation of a registration process for the backup/restore or archival system. (Once registered, the system then knows which software products are available for backing up and restoring, or for archiving, respectively.) An unregistration process may also be provided, which may search for event messages which have been annotated to indicate that the corresponding registration process was previously performed and then re-annotates those events to perform unregistration, in a similar manner to the inventory unregistration process described above. If a message is received indicating that the log file or message file of a particular system is nearing capacity or has reached its capacity, the techniques of the present invention allow using this message when determining which systems need to have an archiving operation performed on their files by an archiving system—even though the message may have been originally intended for some other purpose.

Turning now to FIGS. 4A and 4B, a sample event object is illustrated which may be programmatically created according to the present invention to represent the information which appears in the annotated sample event message of FIG. 3B. FIG. 4A illustrates this object at 400 by providing a class name 401, followed by event slots which begin at 402 and which contain name/value pairs corresponding to the fields of message 320. FIG. 4B illustrates this object at 420 using an object-oriented properties approach, where the properties 422 of a particular instantiation of this object will be populated with the values shown in FIG. 3B (or, equivalently, the values shown in FIG. 4A). Note that the information in the object syntax of FIGS. 3B, 4A, and 4B uses italics to show the information provided through the annotation process of the present invention. (As will be obvious, the three event message forms shown in FIGS. 3B, 4A, and 4B represent equivalent information, and thus may be considered interchangeable.)

FIG. 5 illustrates a sample rule 500 that may be used, according to the present invention, to trigger execution of newly-defined or different capabilities of an EMS using previously-defined events, and in particular, an event such as that represented by the various formats 320 of FIG. 3B, 400 of FIG. 4A, or a populated instance of object 420 of FIG. 4B. Suppose for purposes of illustration that message identifier "PRD1234I" is defined as a "successful installation" message code. Rule 500 thus indicates that successful installation event messages 501 which have been annotated to specify some value for the task field 502 (i.e. "annotatedOperation" has a value such as "INVENTORYCommand") and which are not yet registered (i.e. having an updateFlag value of FALSE) 503 are to perform the action "INVENTORYCommand" 504. Invoking this executable code then (presumably) causes the software product to become registered with the inventory system (or performs some other function in other scenarios). (Typically, information from the containing annotated event will be passed as a parameter or made available through inheritance for use by the executable code, although this is not explicitly shown in the sample rule 500.)

Figure 6:
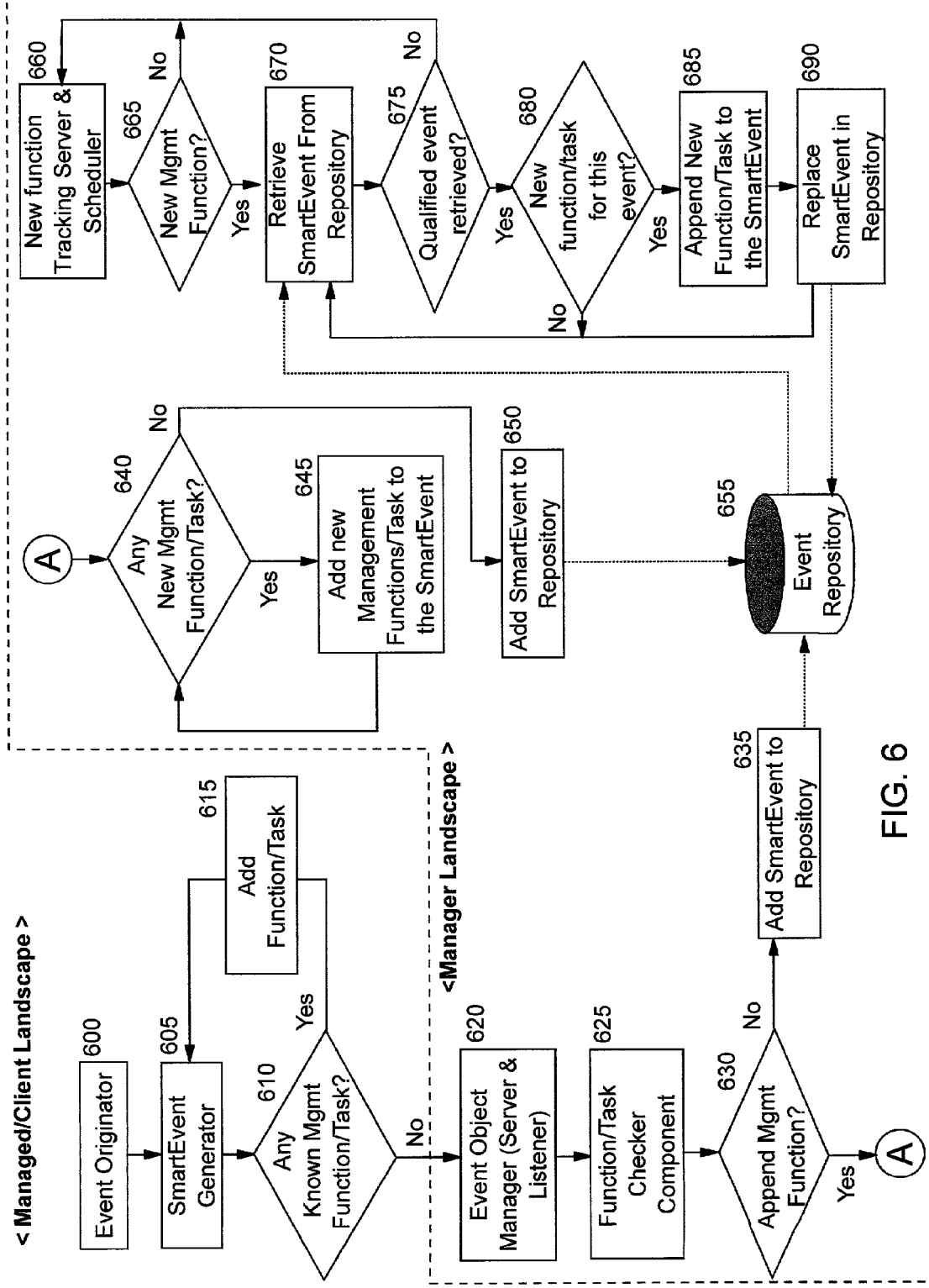
FIGS. 6 and 7 provide flowcharts depicting logic with which preferred embodiments of the present invention may be implemented.
Figure 7:
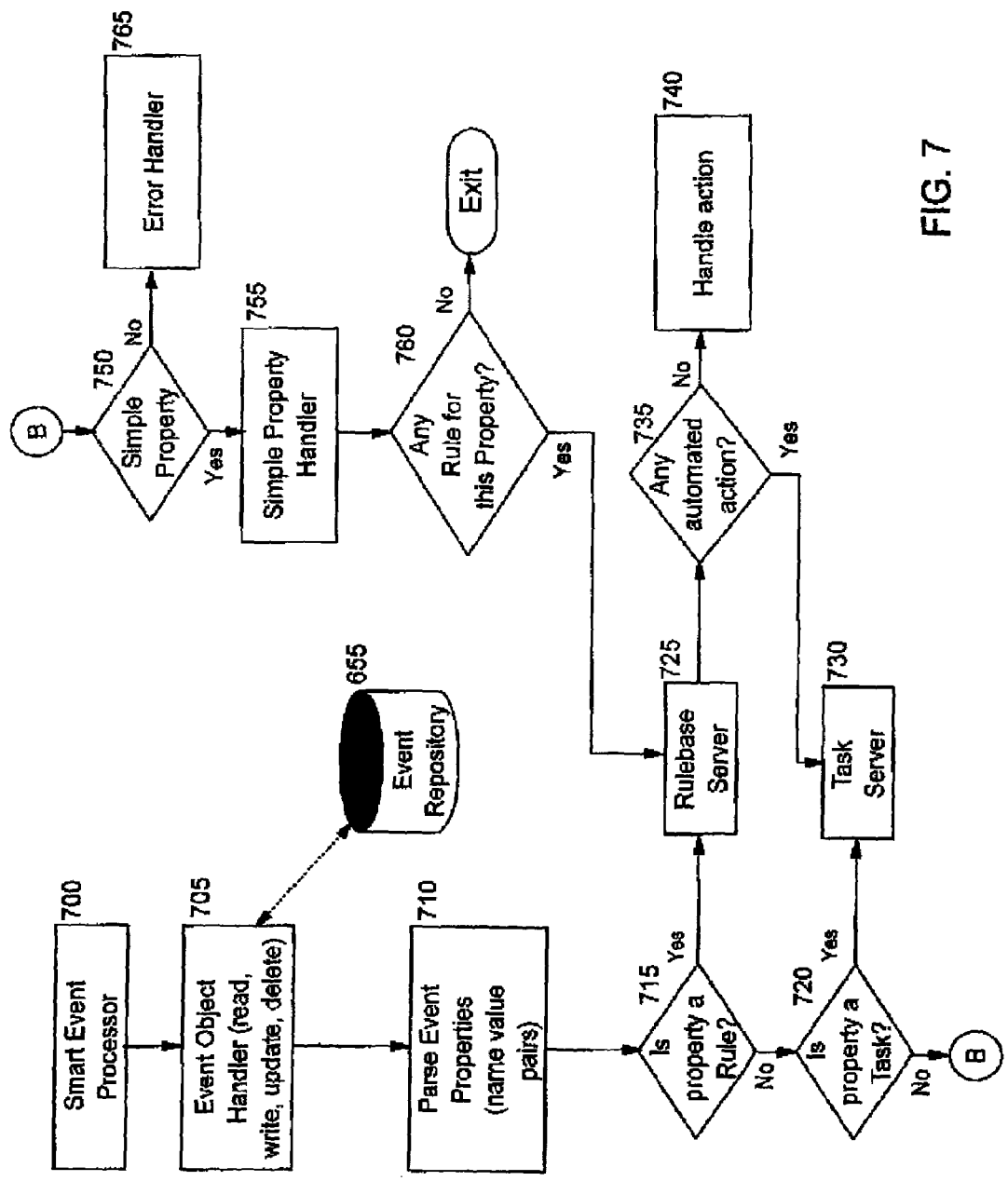

The flowcharts in FIGS. 6 and 7 depict logic with which preferred embodiments of the present invention may be implemented. The logic in FIG. 6 illustrates event generation and reception, as well as annotating incoming and previously-stored events. FIG. 7 provides more detail regarding the execution of the annotations.

Referring to FIG. 6, at Block 600 the executing application program generates an event (using prior art techniques). Blocks 605–615 represent optional function which may be deployed in a client machine or managed system (e.g. by a software adapter of the type previously described for the TEC system, which preprocesses events on their way to the EMS). When implemented, this optional function comprises evaluating each event (Block 605) and determining (Block 610) whether any annotations are known which may be added before transmitting the event to the EMS. This determination may use information such as the message identifier or an event class into which this message identifier falls, or other information or combinations thereof from particular messages, depending on the needs of each implementation. If an applicable annotation is found, it is added (Block 615) to the event, preferably using an extensible syntax such as that shown in FIG. 3B. This process of evaluating the event and appending any applicable annotations repeats until no more applicable annotations are found, after which the event is forwarded on to the EMS. As stated earlier, one type of annotation that may be performed is to append the update flag field 310 to outbound messages. If this optional function of Blocks 605–615 is not implemented, then the event is simply forwarded to the EMS (or to a software adapter which uses prior art techniques) following operation of Block 600.

At Block 620, an event has reached the EMS. Conversions may optionally be performed at this point, such as transforming an unannotated event into an object representation which uses properties rather than slots, and populating the object with the appropriate values from the incoming message. At Block 625, the event reaches a function/task checker component, which evaluates the event and determines (Block 630) whether it is desirable at this point to append any management function(s) to this incoming event as annotations of the type disclosed herein. If the test in Block 630 has a negative result, then at Block 635 the event is added to the event repository 655, after which the processing of this incoming event is (temporarily) complete with respect to the present invention. The event may be annotated later using the logic of Blocks 660–690. (The event may be used as input to a rules engine either before or after it is stored in repository 655, using prior art techniques which do not form part of the present invention.)

If the test in Block 630 has a positive result, then processing continues to Block 640 where an iterative process of determining whether any annotations currently known to the EMS are applicable for this event (e.g. by evaluating the message identifier or other information, or combinations thereof) and, if so, annotating the event accordingly in Block 645. When all annotations have been performed by Blocks 640 and 645, control transfers to Block 650 where the annotated event is added to event repository 655. (Note that this approach assumes that the annotations are separately processed, rather than being immediately executed. The separate processing preferably uses logic such as that shown in FIG. 7.)

The logic in Blocks 660–690 enables the annotation process to be performed upon already-stored events. This logic may be used to annotate previously received events, as described above, including re-annotation of events which have previously been annotated. The annotation process beginning at Block 660 may be invoked in several ways, such as upon expiration of a timer, upon reaching a predetermined counter value which counts the number of events added to the repository since the prior execution of this annotation process, upon receipt of an interrupt, and so forth. In Block 665, an optional test is performed to see if any new capabilities have been added to the EMS since the prior execution of the annotation process. (For example, the EMS may maintain information about its own capabilities, such as the version, release, and modification level of installed features. This information may then be checked programmatically and/or a watch thread may signal when a change occurs.) If not, then the processing of the annotation process may be halted until a subsequent invocation, as shown in FIG. 6 by returning control to Block 660. When there are new capabilities, or when the test is not implemented, Block 670 indicates that an event is retrieved from the repository 655. Block 675 checks to ensure that a qualified event was retrieved. (As one example, this test may comprise determining whether the update flag as illustrated at 350 in FIG. 3B is set on or off.) When no more qualified events are found in the repository, then the test in Block 675 has a negative result and the processing of the annotation process may be halted until a subsequent invocation, as shown in FIG. 6 by returning control to Block 660. Otherwise, Block 680 checks to see if any new capability is applicable to this event. If so, the event is annotated (Block 685) and re-stored in the event repository (Block 690). Processing then returns to Block 670 to continue evaluation of existing events in event repository 655. When the test in Block 680 has a negative result, on the other hand, then this event does not need to be annotated, and the annotation process proceeds to evaluate another event by returning control to Block 670.

One type of annotation that may be performed by Block 685 is a re-annotation of an already-annotated message. This has been previously discussed with reference to programmatically creating information to invoke unregistration processing for events that were previously annotated to invoke a registration task. As another example, the new task which is being dynamically reflected in the events may be to unregister all Product X, version 1.5 installations from the backup/restore processing system. (Perhaps a site-wide decision has been made that the backup and restore processes should be optimized by omitting backup/restore procedures for this software product.) In this case, the processing of Block 685 preferably comprises changing the value of the slot 330 (see FIG. 3B) or property 410 (see FIG. 4A) to the task which will perform this unregistration, and setting the update flag to FALSE to indicate that this task has not yet been performed.

FIG. 7 illustrates logic which may be used to initiate processing of event annotations. As illustrated in FIG. 6, the processing of FIG. 7 is invoked periodically to process annotations which have been stored on events in event repository 655. Alternatively, this processing may be invoked at the time of annotation.

The periodic processing of FIG. 7 may be invoked in ways such as those described above with reference to Block 660 of FIG. 6 (timer expiration, etc.) Operation of the smart (i.e. annotated) event processor begins at Block 700 and preferably calls an event object handler (Block 705), which performs tasks such as reading, writing, updating, and deleting objects from the event repository 655. For purposes of the present invention, the handler reads an event from the repository.

Upon retrieving an event (or, equivalently, an event in object format) in Block 705, Block 710 parses the properties of that event, in order to search for annotations. Block 715 tests whether the currently-evaluated property specifies a rule. If so, then at Block 725 a rule base server process is invoked to process that rule (e.g. by forwarding the rule to a rule base server which will evaluate the current event against the rule). The test in Block 735 determines whether a result of Block 725 indicates that any automated action is to be performed (e.g. by meeting the conditions in the rule located by Block 715). If so, then control preferably transfers to Block 730; otherwise, the action may be handled in another way (Block 740), such as prompting the EMS administrator for further instructions or action, depending on the particular rule.

When the test in Block 715 has a negative result, then Block 720 checks to see if the currently-evaluated property specifies a task to be executed (such as the inventory registration task shown at 410 of FIG. 4A). If this test has a positive result, then at Block 730, a task server or task handler may be invoked to perform the applicable task. For example, the executable code named "INVENTORY Command" is invoked at this point for the example event in FIG. 4A.

If the test in Block 720 has a negative result, then Block 750 checks to see if the currently-evaluated property is a simple property (such as property 430 or 440 of FIG. 4B). If so, then Block 755 invokes a simple property handler which may examine the rule base for any rule associated with the property, as shown in Block 760. If there is no rule associated with the property, then no action is required. Otherwise, the associated rule is handed to the rule base server, as in Block 725. When the test in Block 750 has a negative result, then this is an error and Block 765 may optionally invoke an error handler. The logic of Blocks 710–765 is preferably repeated for each property of the event that was retrieved in Block 705. In this manner, events effectively and efficiently learn about new capabilities of the EMS.

As has been demonstrated, the present invention provides advantageous techniques for use with event management systems, whereby events are automatically and dynamically annotated to adapt to capabilities of the EMS and whereby the EMS may automatically and dynamically recycle existing events for processing with newly-defined or different EMS capabilities. These benefits are realized without requiring re-instrumentation of the event generation code of managed applications.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method of enabling events to automatically and dynamically adapt to capabilities of a management system, comprising steps of:
   receiving, at the management system from at least one managed device, one or more events which are generated by, and sent from, at least one application executing at the at least one managed device; and
   evaluating, at the management system, each received event to determine if an additional capability for the evaluated event is available for execution at the management system, and programmatically appending the additional capability to the evaluated event if so, such that processing of the appended additional capabilities can be programmatically invoked;
   thereby automatically and dynamically adapting the received events to the executable capabilities of the management system without requiring change to the at least one application generating and sending the events.

2. The method according to claim 1, further comprising the step of programmatically invoking processing of the appended additional capabilities.

3. The method according to claim 2, wherein the additional capability appended to selected ones of the events comprises a name of an executable task and wherein the programmatically invoking step comprises executing the named task.

4. The method according to claim 2, wherein the additional capability appended to selected ones of the events comprises a rule to be evaluated by a rule base server and wherein the programmatically invoking step comprises evaluating the rule by the rule base server.

5. The method according to claim 2, wherein the additional capability appended to selected ones of the events comprises a property name and value and wherein the programmatically invoking step comprises determining if a rule associated with that property name and value exists in a rule base and evaluating the rule if so.

6. The method according to claim 1, wherein the additional capability appended to select ones of the events comprises a name of an executable task.

7. The method according to claim 1, wherein the additional capability appended to selected ones of the events comprises a rule to be added to a rule base server.

8. The method according to claim 1, wherein the additional capability appended to selected ones of the events comprises a property name and value.

9. The method according to claim 1, wherein a flag indicates whether the appended additional capability for a selected event has been processed.

10. The method according to claim 2, wherein a precondition for the programmatically invoking step comprises determining whether an appended additional capability is present on a selected event, and determining that the appended additional capability has not already been performed.

11. The method according to claim 1, wherein the programmatically appending further comprises adding a slot to a representation of the event.

12. The method according to claim 1, wherein the programmatically appending further comprises adding a property to an object representing the event.

13. The method according to claim 1, wherein the programmatically appending step further comprises adding a field to a representation of the event.

14. A system for enabling events to automatically and dynamically adapt to capabilities of a management system, comprising:
   means for receiving, at the management system from at least one managed device, one or more events which are generated by, and sent from, at least one application executing at the at least one managed device; and
   means for evaluating, at the management system, each received event to determine if an additional capability for the evaluated event is available for execution at the management system, and programmatically appending the additional capability to the evaluated event if so, such that processing of the appended additional capabilities can be programmatically invoked;
   thereby automatically and dynamically adapting the received events to the executable capabilities of the management system without requiring change to the at least one application generating and sending the events.

15. The system according to claim 14, further comprising means for programmatically invoking processing of the appended additional capabilities.

16. The system according to claim 14, wherein the additional capability appended to selected ones of the events comprises a name of an executable task and wherein the means for programmatically invoking comprises means for executing the named task.

17. The system according to claim 14, wherein the additional capability appended to selected ones of the events comprises a rule to be evaluated by a rule base server and wherein the means for programmatically invoking comprises means for evaluating the rule by the rule base server.

18. The system according to claim 14, wherein the additional capability appended to selected ones of the events comprises a property name and value and wherein the means for programmatically invoking comprises means for determining if a rule associated with that property name and value exists in a rule base and means for evaluating the rule if so.

19. The system according to claim 14, wherein a precondition for operation of the means for programmatically invoking comprises determining whether an appended additional capability is present on a selected event, and determining that the appended additional capability has not already been performed.

20. A computer program product for enabling events to automatically and dynamically adapt to capabilities of a management system, the computer program product embodied on one or more computer-usable media for execution on one or more computing devices and comprising:
  computer readable program code means for receiving, at the management system from at least one managed device, one or more events which are generated by, and sent from, at least one application executing at the at least one managed device; and
  computer readable program code means for evaluating, at the management system, each received event to determine if an additional capability for the evaluated event is available for execution at the management system, and programmatically appending the additional capability to the evaluated event if so, such that processing of the appended additional capabilities can be programmatically invoked;
  thereby automatically and dynamically adapting the received events to the executable capabilities of the management system without requiring change to the at least one application generating and sending the events.

21. The computer program product according to claim 20, further comprising computer readable program code means for programmatically invoking processing of the appended additional capabilities.

22. The computer program product according to claim 20, wherein the additional capability appended to selected ones of the events comprises a name of an executable task and wherein the computer readable program code means for programmatically invoking comprises computer readable program code means for executing the named task.

23. The computer program product according to claim 20, wherein the additional capability appended to selected ones of the events comprises a rule to be evaluated by a rule base server and wherein the computer readable program code means for programmatically invoking comprises computer readable program code means for evaluating the rule by the rule base server.

24. The computer program product according to claim 20, wherein the additional capability appended to selected ones of the events comprises a property name and value and wherein the computer readable program code means for programmatically invoking comprises computer readable program code means for determining if a rule associated with that property name and value exists in a rule base and means for evaluating the rule if so.

25. The computer program product according to claim 20, wherein a precondition for operation of the computer readable program code means for programmatically invoking comprises determining whether an appended additional capability is present on a selected event, and determining that the appended additional capability has not already been performed.

26. A computer-implemented method of enabling events to adapt to available capabilities, comprising steps of:
  receiving, at an event processor from a device, an event generated by a sending application, wherein a reference in the received event is usable at the event processor to invoke processing of a first capability;
  evaluating, at the event processor, the received event to determine whether a second capability is available for invoking at the event processor for the evaluated event, although the received event fails to reference the second capability; and
  programmatically annotating, at the event processor, the evaluated event to reference the determined second capability, when the evaluating step has a positive result, such that the event generated by the sending application can invoke processing of the second capability without requiring the sending application to have awareness of the second capability.

27. The computer-implemented method according to claim 26, wherein the first capability is notification of installation of a software product at the device and the second capability is registration of the installed software product with an inventory management system.

28. The computer-implemented method according to claim 26, wherein the first capability is notification of installation of a software product at the device and the second capability is registration of the installed software product with a backup/restore system.

29. The computer-implemented method according to claim 26, wherein the first capability is notification of installation of a software product at the device and the second capability is registration of the installed software product with an archiving system.

30. The computer-implemented method according to claim 26, wherein the first capability is notification of installation of a particular version of a software product at the device and the second capability is registration of the particular version with an inventory management system, and further comprising the step of programmatically annotating the received event with a reference to a third capability, responsive to detecting the reference to the first capability, wherein the third capability is unregistration of a different version of the installed software product.

* * * * *

Disclaimer 6,961,940 B2 — Kenneth Mark Hunsinger, Raleigh, NC (US); Patrick P. Reynolds, Morrisville, NC (US); Abdolreza Salahshour, Raleigh, NC (US). FABRICATOR CAPACITY ANALYSIS. Patent dated November 1, 2005. Disclaimer filed October 6, 2006, by the assignee, International Business Machines Corporation.

Hereby enters this disclaimer to claims 1-30, of said patent.

*(Official Gazette October 14, 2008)*